(12) United States Patent
He et al.

(10) Patent No.: US 6,607,050 B2
(45) Date of Patent: Aug. 19, 2003

(54) INTEGRATED OCEAN BOTTOM TOWED ARRAY FOR FOUR-COMPONENT SEISMIC DATA ACQUISITION

(75) Inventors: Guoxin He, Xi'an Shanxi (CN); Zailu Zhang, Xi'an Shanxi (CN); Peichang Li, Xi'an Shanxi (CN); Yi Lin, Xi'an Shanxi (CN); Xiaoquan Han, X'an Shanxi (CN); Defu Cai, Xi'an Shanxi (CN); Jingping Xiao, Xi'an Shanxi (CN); Yonglin Zhang, Xi'an Shanxi (CN)

(73) Assignee: China National Petroleum Corporation, Beijing (CN)

( * ) Notice: Subject to any disclaimer, the term of this patent is extended or adjusted under 35 U.S.C. 154(b) by 168 days.

(21) Appl. No.: 09/838,642

(22) Filed: Apr. 19, 2001

(65) Prior Publication Data

US 2001/0035311 A1 Nov. 1, 2001

(30) Foreign Application Priority Data

Apr. 26, 2000 (CN) .......................... 00113795 A (51) Int. Cl.$^7$ ................................. G01V 1/00
(52) U.S. Cl. ............................ 181/110; 367/20; 367/57
(58) Field of Search ................. 181/110, 111, 181/112, 120; 367/20, 21, 25, 37, 38, 57

(56) References Cited

U.S. PATENT DOCUMENTS

| | | | | |
|---|---|---|---|---|
| 3,921,755 A | * | 11/1975 | Thigpen | 181/112 |
| 4,078,223 A | * | 3/1978 | Strange | 181/112 |
| 4,163,206 A | * | 7/1979 | Hall, Jr. | 367/160 |
| 4,893,290 A | * | 1/1990 | McNeel et al. | 181/102 |
| 5,136,549 A | * | 8/1992 | Berglund | 181/112 |
| 5,189,642 A | * | 2/1993 | Donoho et al. | 181/122 |
| 5,274,603 A | * | 12/1993 | Zibilich et al. | 367/20 |
| 5,991,238 A | * | 11/1999 | Barr | 367/22 |
| 6,005,828 A | * | 12/1999 | Carroll et al. | 181/110 |
| 6,021,092 A | * | 2/2000 | Paffenholz et al. | 367/24 |
| 6,041,282 A | * | 3/2000 | Wardeberg et al. | 702/1 |
| 6,201,764 B1 | * | 3/2001 | Rice et al. | 181/110 |
| 6,246,637 B1 | * | 6/2001 | Gidlow | 367/20 |
| 6,333,898 B1 | * | 12/2001 | Knudsen et al. | 367/20 |

* cited by examiner

Primary Examiner—Robert E. Nappi
Assistant Examiner—Edgardo San Martin
(74) Attorney, Agent, or Firm—David Silverstein; Andover-IP-Law (57) ABSTRACT

An integrated ocean bottom towed four-component array for seismic data acquisition consists of a four-channel electronic section for seismic data collection, a gimbaled three-component geophone and a hydrophone in a housing. The array connects with a submarine cable through a cable joint in order to acquire four components of data consisting of seismic P wave, shear wave and hydrophone in total. Through cable data transmission and processing in a central station, ocean bottom oil and gas structure information can be obtained. Because of the high SNR acquisition in the ocean bottom seismic data acquisition of the present invention, and the waterproof cable interconnections between each of the sections of the present apparatus, data acquisition of high quality can be gained to realize highly efficient and easy ocean bottom towing operations.

14 Claims, 7 Drawing Sheets

INTEGRATED OCEAN BOTTOM TOWED ARRAY FOR FOUR-COMPONENT SEISMIC DATA ACQUISITION

TECHNICAL FIELD OF THE INVENTION

This invention refers to an ocean bottom geophysical exploration instrument, especially to a data acquisition array for conducting a marine multiwave seismic survey.

BACKGROUND OF THE INVENTION

The current modes of a data acquisition array or system for conducting a marine multiwave seismic survey are described below. One mode is to adopt a streamer cable system in which the analog signals are transmitted in the cable. It will be digitized, recorded and processed in the central station. The shortcomings of this mode are that the quality of acquisition data is bad because the analog signal transmission line is too long, the signals are easily influenced, and the signals and noise are transferred in a mixed and overlapping mode so that the SNR of the acquisition data is lower and even signals are submerged by noise. Another mode is to adopt a distribution ocean bottom cable data acquisition array that uses mostly 12–24 channel data acquisition, with digitized data transmission in the cable and recording in a central station. For the current ocean bottom cable in some countries, many geophones are tapped on the cable. The geophone taken as a sensor cannot be towed because it is bound to the cable. The cable is too cumbersome with low strength of extension. With continuous movement and change of measuring points, the cable must be drawn and released frequently. For the above reasons, the labor intensity is very great so that it adversely influences the production efficiency. At the same time, it will cause a great interference on signals because the analog signal wire connected with the sensor is still too long, so the SNR of the acquired data is not high. This array is also complicated to manufacture and both difficult and expensive to maintain.

A description of existing products in this field can be found in the specification and introduction of pictures on pages 6 and 7 under Ocean Bottom Cable in the products brochure entitled SYNTRON of American Syntron Inc.

SUMMARY OF THE INVENTION

The aim of this invention is to provide a high-accuracy, high SNR, portable and towable integrated ocean bottom four-component array for seismic data acquisition. This integrated array can collect or acquire four key components of seismic signals simultaneously in total, which components are: one vertical component (V) of a seismic (P) wave using a geophone, two horizontal components (SX) and (SY) of a seismic shear wave using geophones, and one acceleration component (H) using a hydrophone. The first three components of the four above-mentioned components which are collected by the array of this invention are velocity components which are sensed using geophones as the velocity sensors; and, the fourth component, the one sensed using a hydrophone, is the acceleration sensor. According to the requirement in ocean bottom cable operation, several integrated sections or units can be connected in series via submarine cable to form a multi-channel seismic data acquisition system.

To achieve the aim of the present invention, an integrated ocean bottom towed four-component array for seismic data acquisition mainly consists of a submarine cable having a cable joint and a hydrophone section, a four-channel electronic section, and a three-component geophone section assembled in a sealed housing, and connected with the submarine cable through the cable joint. It is characterized in that The said submarine cable has an armored structure in which a power line and a data transmission line are assembled in its central part; packing cords surrounding an internal protective layer are filled up around the armored structure; inner layer steel wire ropes and outer layer steel wire ropes are installed as a cable reinforcement part covered by an external protective layer.

The said hydrophone comprises several round ceramic wafers on the acoustically transparent housing and an impedance converting transformer to form a real acceleration sensor.

The said electronic section for seismic data acquisition comprises a CPU board, a data transmission board, an acquisition board for channel 1–2, an acquisition board for channel 3–4, and a power board on the printed circuit stand, having its (V), (SX), (SY) and (H) signal input channels for data acquisition;

The said geophone section is three velocity sensors comprising the two horizontal component geophones, and the one vertical component geophone on the same gimbal mount, with a short wire connected between the geophones and the electronic section internally;

Each section is designed as a four-component receiving point and is connected to each other section via said submarine cable in series to form a multi-channel acquisition system.

In other words, the integrated array of the present invention mainly consists of a submarine cable, hydrophone, a four-channel electronic section for seismic data acquisition, a three-component geophone section, a sealed housing and a cable joint. The three-component geophone section, the hydrophone section, and the electronic section are assembled in a sealed housing. After the housing is connected with the submarine cable through the cable joint, it forms a complete integrated ocean bottom towed four-component array for seismic data acquisition, that is, the various electromechanical parts as described are integrated into one unit. The geophones in the three-component geophone section are three velocity geophones. They are assembled on the same double-shaft gimbal mount, which can realize a flexible 360° rotation to adjust the geophones to achieve optimal receiving status. In the hydrophone, an acceleration sensor is used. A short wire is connected internally between the geophones and the electronic section in order to reduce the signal interference caused by the environment and to improve SNR of data. All sections or parts in the integrated arrays for seismic data acquisition are connected with a water-resistant cable without taps. The cable is one with an armored structure in which two inner and outer layers of steel wire ropes are used as a reinforced part to enhance the cable intensity of extension. On the cable, there are no bindings such as geophones and so on so that it is easy to accommodate an ocean bottom towing operation. Each integrated array is designed as a four-component receiving point A multi-channel acquisition system is formed after several integrated arrays are connected with submarine cables.

The electronic section for seismic data acquisition comprises a CPU board, a data transmission board, separate acquisition boards for channel 1–2 and channel 3–4, and a power board on the printed circuit stand. In order to improve SNR and measurement precision, a structure without a backboard is used, and all the printed boards are connected directly with connectors. When data from the four components are transferred in the electronic section for seismic data acquisition, the high-frequency interference in signals can be filtered out through the line filter. The signals will be amplified or not after being transferred to the preamplifier and then sent to the A/D converter for digitization. According to sample rate and channel series, the digitized data are treated by the microprocessor and then transferred to the data flow of the data transmission cable. Then, the treated data are transmitted through the data transmission cable to a ground central station for data recording. The recorded tapes or disks are provided as source data tapes or disks to the processing center for data processing so that the desired oil and gas structure information can be obtained from the marine seismic survey.

This invention has the following advantages.

As there are only four channels for data acquisition in each electronic section, the dimensions of the integrated electronic section can be reduced greatly with a reduced length of the submarine cable connecting them. As the connecting wire is an internal short connection between the geophones as a sensor and the acquisition channel of the electronic section, and all the parts are sealed in an identical housing, the structure of the present invention can avoid the usual interference caused by the other objects on the analog signal line. As a result, interference caused by the environment can be reduced, and cross talk between channels can be avoided and, therefore, the SNR of the signals is improved. Three component geophones are installed on the same double-shaft gimbal mount, which can realize a 360° free rotation to adjust the geophones to the optimal receiving status. As there are no sensor taps and also no bindings such as geophones and the like on the cable, it can be realized that the cable connection between all the electronic sections in a multi-channel acquisition system is sealed and connected with each other for use under water. The cable used can also be light-weight with a small diameter and is relatively less expensive than larger, heavy-duty cable. The production cost of the total integrated array or the acquisition system can be reduced correspondingly. This system can be easily and freely towed on a flat ocean sand bottom. Therefore labor intensity will be reduced when the present system is used, and the system can be easily maintained.

DETAILED DESCRIPTION OF THE INVENTION

The following paragraphs will describe the implementing examples of this invention in detail.

Figure 1:
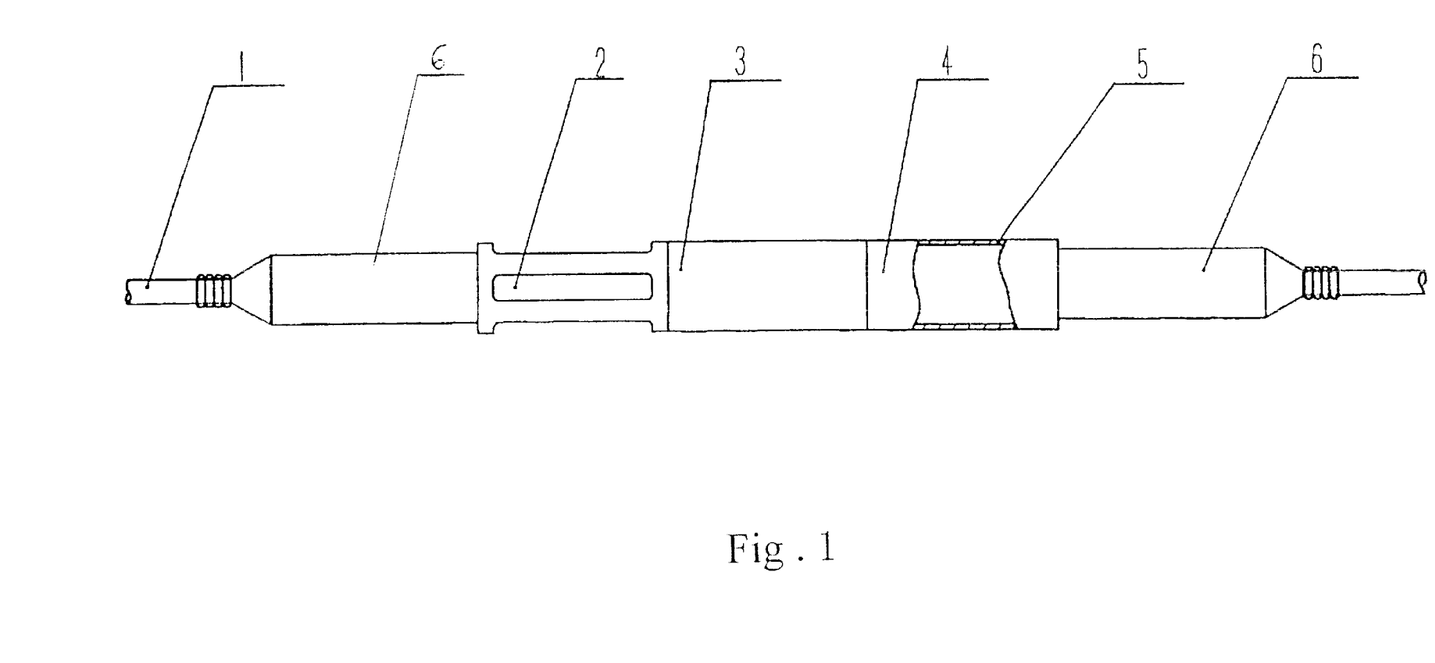
FIG. 1. is a schematic diagram of the structure of an integrated ocean bottom towed four-component array for seismic data acquisition according to the present invention.
Figure 2:
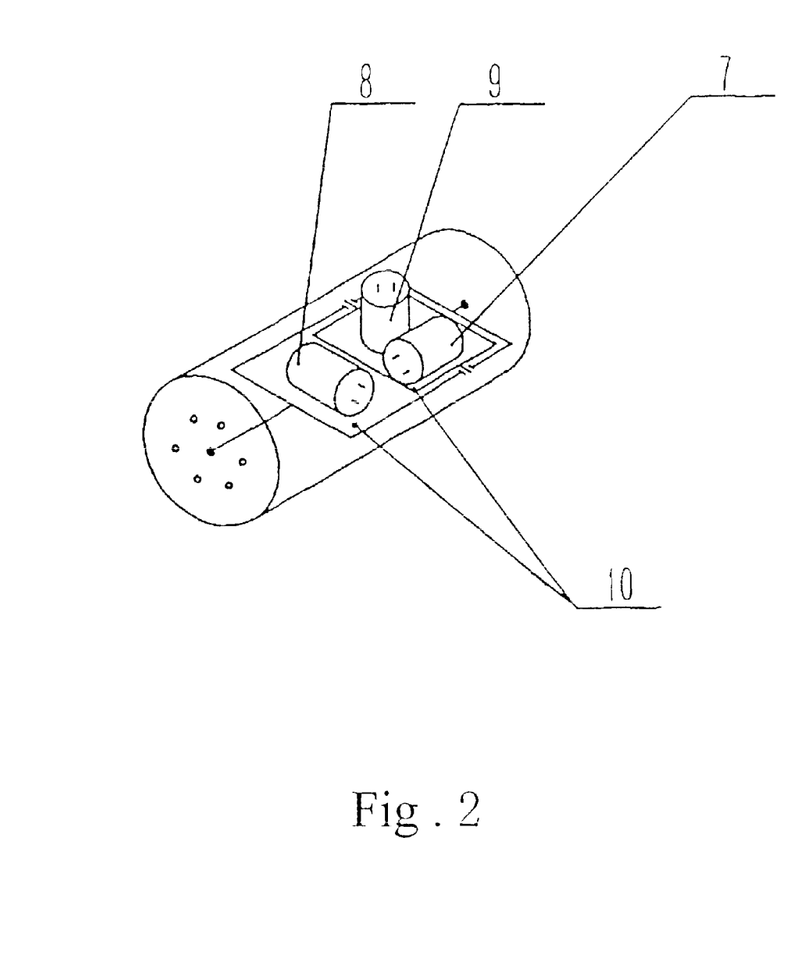
FIG. 2. is a schematic diagram of the structure of the three-component geophone section according to the present invention.

According to FIG. 1, the integrated ocean bottom towed four-component array for seismic data acquisition of the present invention mainly consists of a submarine cable 1, a hydrophone 2, a four-channel electronic section for seismic data acquisition 3, a three-component geophone section 4, a housing 5, and a cable joint 6. The three-component geophone section 4 and the hydrophone 2 are used to collect one vertical component of seismic P wave, two horizontal components of seismic shear wave, and one component of hydrophone. These components are all assembled together with the four-channel electronic section for seismic data acquisition 3 in a completely sealed housing 5. The housing is made of antimagnetic stainless steel materials, is water-resistant, and withstands high pressure. It can withstand seawater pressure of at least about 3 mega-Pa. After the housing 5 is connected with the water-resistant submarine cable 1 without taps through the cable joint 6, a complete integrated ocean bottom towed four-component array for seismic data acquisition in accordance with the present invention is formed. The array of the present invention can avoid geophones bound to the cable and cable taps so that it can meet the requirements of an ocean bottom towing operation. Thus, work efficiency is greatly enhanced. The apparatus of the present invention can also be utilized to form a multi-channel acquisition system when a plurality of such integrated arrays are connected in series.

Figure 3:
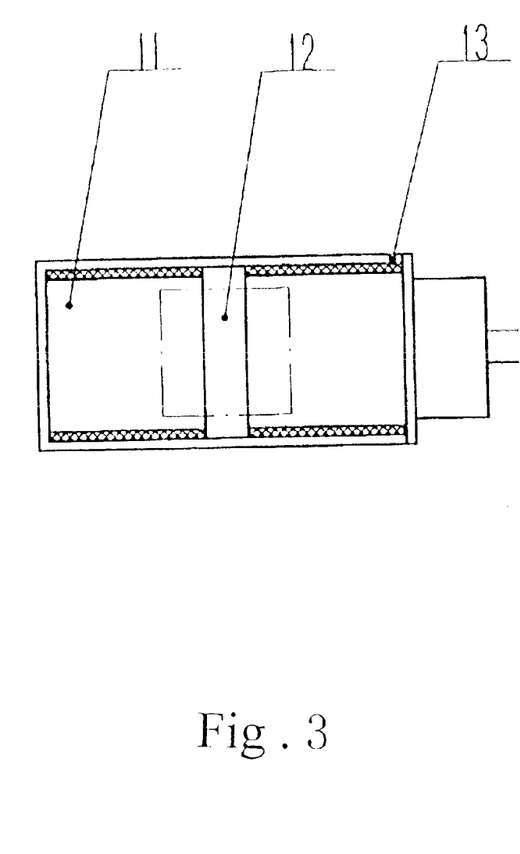
FIG. 3. is a schematic diagram of the structure of the hydrophone section according to the present invention.

According to FIG. 3, the hydrophone 2, as shown in FIG. 1, comprising several round and thin ceramic wafers 11 on an acoustically transparent housing 13, together with a small impedance converting transformer 12, forms a real acceleration sensor with low-frequency voltage output. The natural frequency of the hydrophone is 10 Hz±1.5%, output voltage sensitivity =13V±15%/bar (−197.dB±1.5 dB/microbar), frequency response=10–1000 Hz (pass-band flatness ±1 dB), operational pressure=2 mega-Pa, maximum pressure=3 mega-Pa. The hydrophone of the present invention can be used to collect the seismic data signals and transfer them to data signal input channel H in the four-channel electronic section 3 for seismic data acquisition. It is mainly used to detect the singing conditions of an ocean bottom vibration wave.

According to FIG. 3, the hydrophone 2, as shown in FIG. 1, comprising several round and thin ceramic wafers 11 on an acoustically transparent housing 13, together with a small impedance converting transformer 12, forms a real acceleration sensor with low-frequency voltage output. The natural frequency of the hydrophone is 10 Hz±1.5%, output voltage sensitivity=13V±15%/bar (−197.dB±1.5 dB/millibar), frequency response=10–1000 Hz (pass-band flatness ±1 dB), operational pressure=2 mega-Pa, maximum pressure=3 mega-Pa. The hydrophone of the present invention can be used to collect the seismic data signals and transfer them to data signal input channel H in the four-channel electronic section 3 for seismic data acquisition. It is mainly used to detect the singing conditions of an ocean bottom vibration wave.

Figure 4:
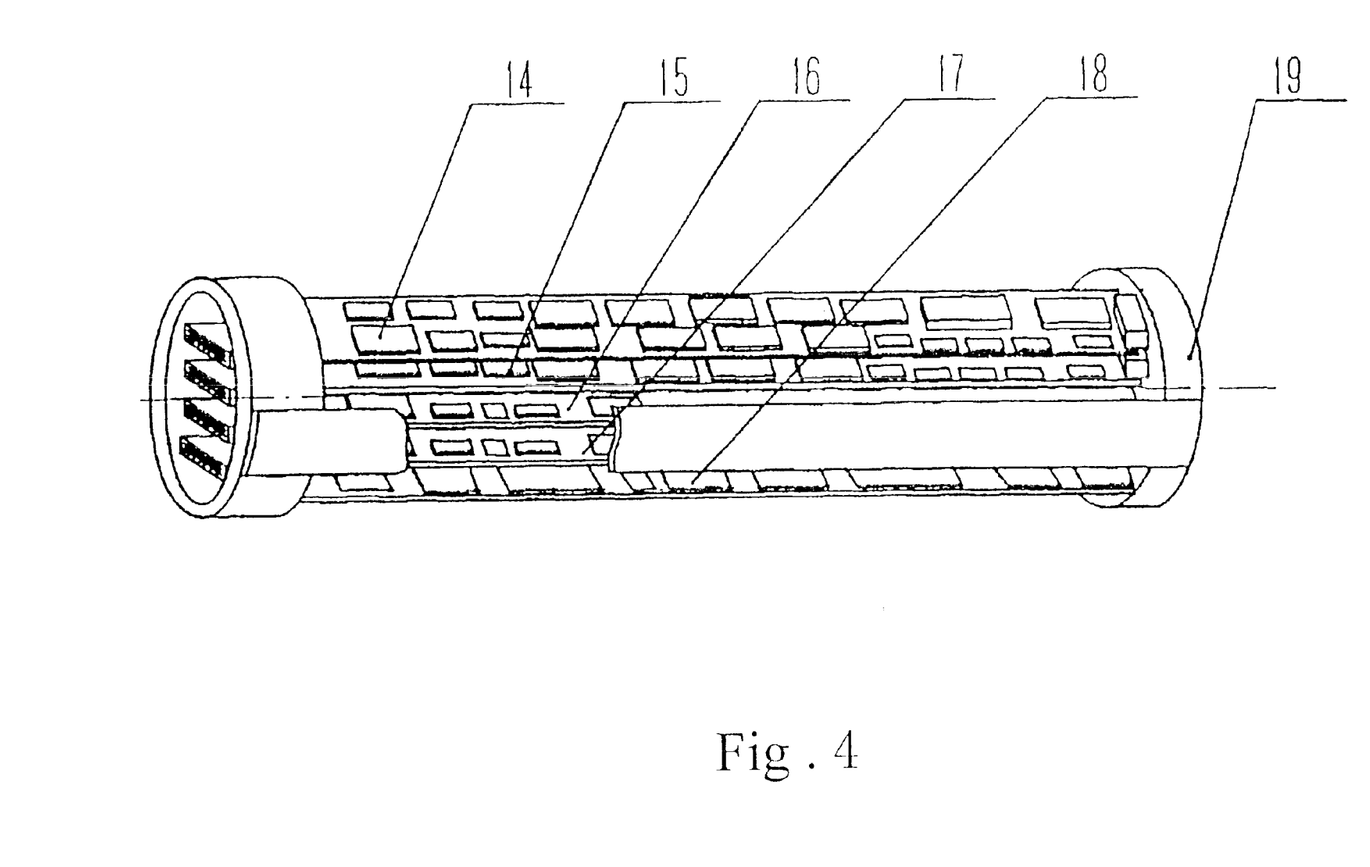
FIG. 4. is a schematic diagram of the structure of the four-channel electronic section for seismic data acquisition according to the present invention.

According to FIG. 4, a four-channel electronic section for seismic data acquisition 3, as shown in FIG. 1, comprises a CPU board 14, a data transmission board 15, an acquisition board for channel 1–2 16, a collecting board for channel 3–4 17, and a power board 18 on a printed circuit stand 19. Between all the printed circuit boards, a structure without a backboard and with direct connection of connectors is used. Its V, SX, SY and H are four signal input channels for component data acquisition.

Figure 5:
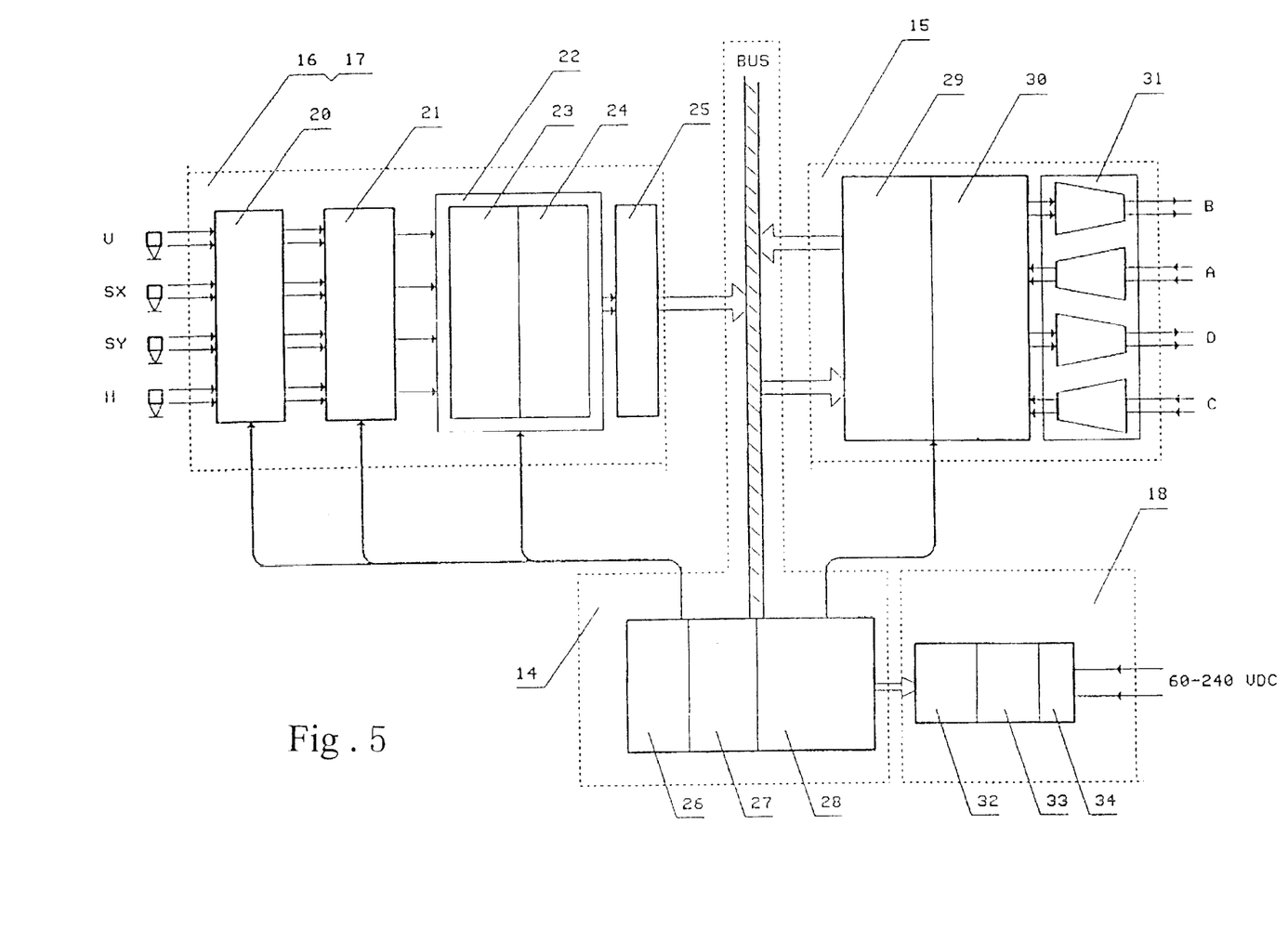
FIG. 5. is a block diagram of the electronic principle of the four-channel electronic section for seismic data acquisition according to the present invention.

As shown in FIG. 4 and FIG. 5, the said acquisition boards for channel 1–2 16 and for channel 3–4 17 consist of a line filter 20; a preamplifier 21; a Σ-Δ model of 24-bits A/D converter 22 including a modulator 23 and a digital filter 24; and a data register 25 to realize the reception and quantization of component input data signals (V), (SX), and (SY) from three geophones and (H) from the hydrophone. The CPU board 14 consists of a microprocessor chip 26, a program and data storage element 27, and a read-write decoding and control circuit 28. The data transmission board 15 consists of a data and command buffer 29, an encoding and decoding circuit and all kinds of registers 30, and a receiving and transmitting interface circuit 31. The output terminals A, C and output terminals B, D of data transmission board 15 are used to connect with the cable transmission line and transfer all kinds of command data flows sent by the ground central station and all kinds of information after the electronic section encodes the acquisition data. The power board 18 consists of a DC/DC converter 32 (digital ±5V), a DC/DC converter 33 (analog ±5V) and a line power input device 34 (60–240V DC input).

Now, the basic operational procedure of the four-channel electronic section for seismic data acquisition is given below:

The four-component data signals SX, SY, V and H from the three-component geophones 7, 8 and 9 and the hydrophone 2 are transferred into the four channels of the electronic section 3 for seismic data acquisition. After the high-frequency interference is filtered out through the line filter 20, the preamplifier 21 comprising a precision instrument amplifier will amplify the signals 1, 8, or 64 times (e.g., amplification of 0, 18 or 36 dB). The three fixed gains of 0, 18 or 36 dB can be selected with programmable control and then transferred to the Σ-Δ 24-bits A/D converter 22 to be quantized. The A/D converter is 24-bits, among which one bit is the sign bit, and the other 23 bits are the mantissa bits. The 24-bits A/D converter comprises a modulator 23 and a digital filter 24. The modulator makes over-sampling and delta modulation (DM) of signals. And the digital filter forms the alias filter and extraction filter. The converted data is stored in the data register 25 temporarily.

For each channel, according to the sample rate and channel series, the quantized sampling data are edited by the microprocessor 26 and transferred to the data and command buffer 29 of the data transmission board. The program and data storage 27 (also called the program storage and the data storage) on the CPU board provides the program instruction codes to be executed. The read/write decoding as well as the control circuit 28 are used to decode the commands sent by the central station to produce all kinds of commands to control the acquisition channels and data transmission section. In addition, on the data transmission board 15, the command data flow sent through the cable transmission line of the input terminals A and C from the receiving and transmitting interface circuit 31 are transferred to the encoding and decoding circuit 30 to be decoded. Then such data flow is transferred through the command buffer 29 to the CPU to realize the set-up and control of all kinds of parameters of the electronic section. Optionally, the sampled data is sent to the transmission line via output terminals B and D by the receiving and transmitting interface circuit 31 after encoding in the encoding and decoding circuit 30.

The ground central station supplies the four-channel electronic section for seismic data acquisition 3 of the present invention with 60V–240V DC power supply through the ocean bottom cable. It is supplied through the line power input device simultaneously to DC/DC converter 32 to supply ±5V DC power needed by the digital circuit, and to DC/DC converter 33 to produce ±5V DC power needed by the analog circuit. Supplying the three groups of regulated DC power, as described, at the same time assures the normal operation of all the parts of the electronic section, such as the acquisition board of channel 1–2 16, the acquisition board of Channel 3–4 17, the CPU board 14, and the data transmission board 15.

The main technical specifications of the four-channel electronic section (3) for seismic acquisition are as follows.

Number of channels=4; sample rate=0.5, 1 and 2 ms; frequency response=0–824 Hz; preamplifier gain=0, 18 and 36 dB; equivalent input noise=<0.2 μv RMS (36 dB gain, 2 ms); A/D converter=24-bits, Σ-Δ (1 sign bit+23 mantissa bits); harmonic distortion=<0.0005%; data transmission rate=6.144 Mega bits/s; transmission code format=HDB3; error rate=<$10^{-8}$.

Figure 6:
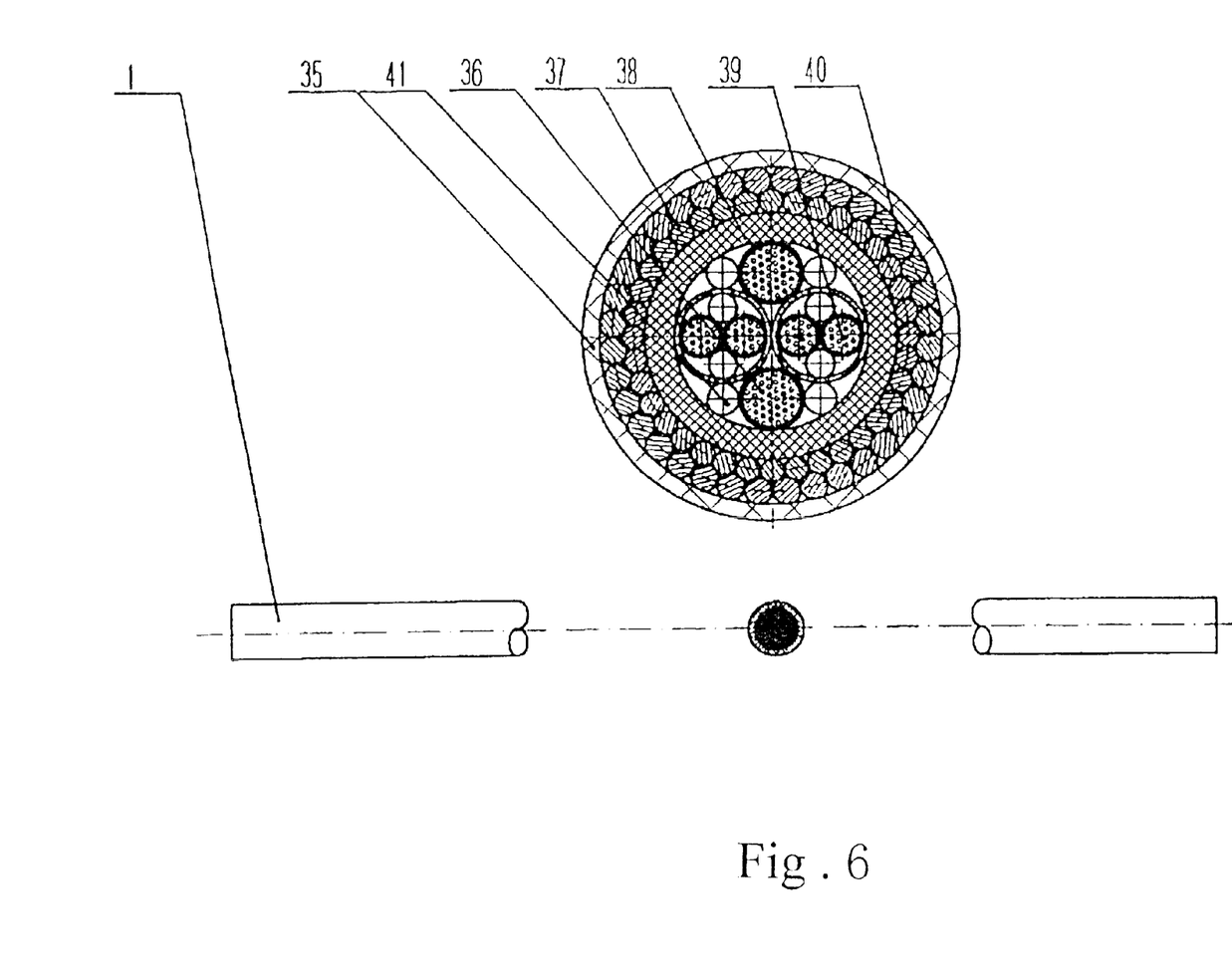
FIG. 6. is a schematic diagram of the structure of the submarine cable according to the present invention.

According to FIG. 6, the power line 36 and the data transmission line 39 are assembled in the center of a submarine cable 1 (also herein called the ocean bottom towed cable). The packing cords 41 are filled up around it. Its outside is surrounded by an internal protective layer 38. Inner layer steel wire ropes 37 and outer layer steel wire ropes 40 are assembled as cable reinforcing elements. The most external outside of the cable 1 is covered with an external protective layer 35. Each segment of the submarine cable is preferably 31 meters long. On both of the cable ends are assembled the water-resistant, corrosion-resistant cable joints 6, as shown in FIG. 1, capable of withstanding pressure of at least about 3 mega-Pa. The middle section of the cable is free of taps. This structure will avoid the bound geophones and taps on the cable. The ocean bottom cable of the present invention has an armored structure so that the cable intensity of extension is increased greatly in order to meet the requirements of direct towing for an ocean bottom operation and to enhance performance efficiency.

The core of the cable with the armored structure includes at least a pair of power lines 36 and two pairs of transmission lines 39. The DC resistance of the pair of power lines is less 2 Ohm when it is 31 m long at 20° C. When DC is 500V, the insulation should be ≧150 mega-Ohm for the cable per 1000 m. The characteristic impedance of the two pairs of data transmission lines is 145±10 Ohm with 2–12 MHz frequency signals. On the outside of the power line and the data transmission lines, the inner layer steel wire ropes 37 and outer layer steel wire ropes 40 are used as cable reinforcing elements. The corrosion-resistant steel wire rope in the inner layer is twisted and fabricated from zinc high-carbon steel of 1.0 mm. The corrosion-resistant steel wire rope in the outer layer is twisted and fabricated from zinc high-carbon steel of 1.2 mm. This structure makes the cable breaking strength ≧6.5 t with a working load of 3.25 t, bending radius of ≦61 cm, outer diameter of ≦22 mm, and working pressure of ≦4 mega-Pa. Between the core of cable and the inner layer steel wire rope, and on the outside of the outer layer steel wire rope, the internal protective layer 38 and the external protective layer 35 are compressed as a protective layer. The two protective layers are made of insulation materials such as polyacrylate and similar materials to avoid sea-water leakage. Thus, this apparatus can satisfy the waterproof, corrosion-resistant and pressure-resistant objectives of the present invention The length of each armored cable is preferably 31 m. Such a cable weighs 21 kg, 13.5 kg and 7.7 kg respectively when weighed in air, fresh water, and sea water. The submarine cable is mainly used for data transmission and power supply to the four-channel electronic section for seismic data acquisition.

Figure 7:
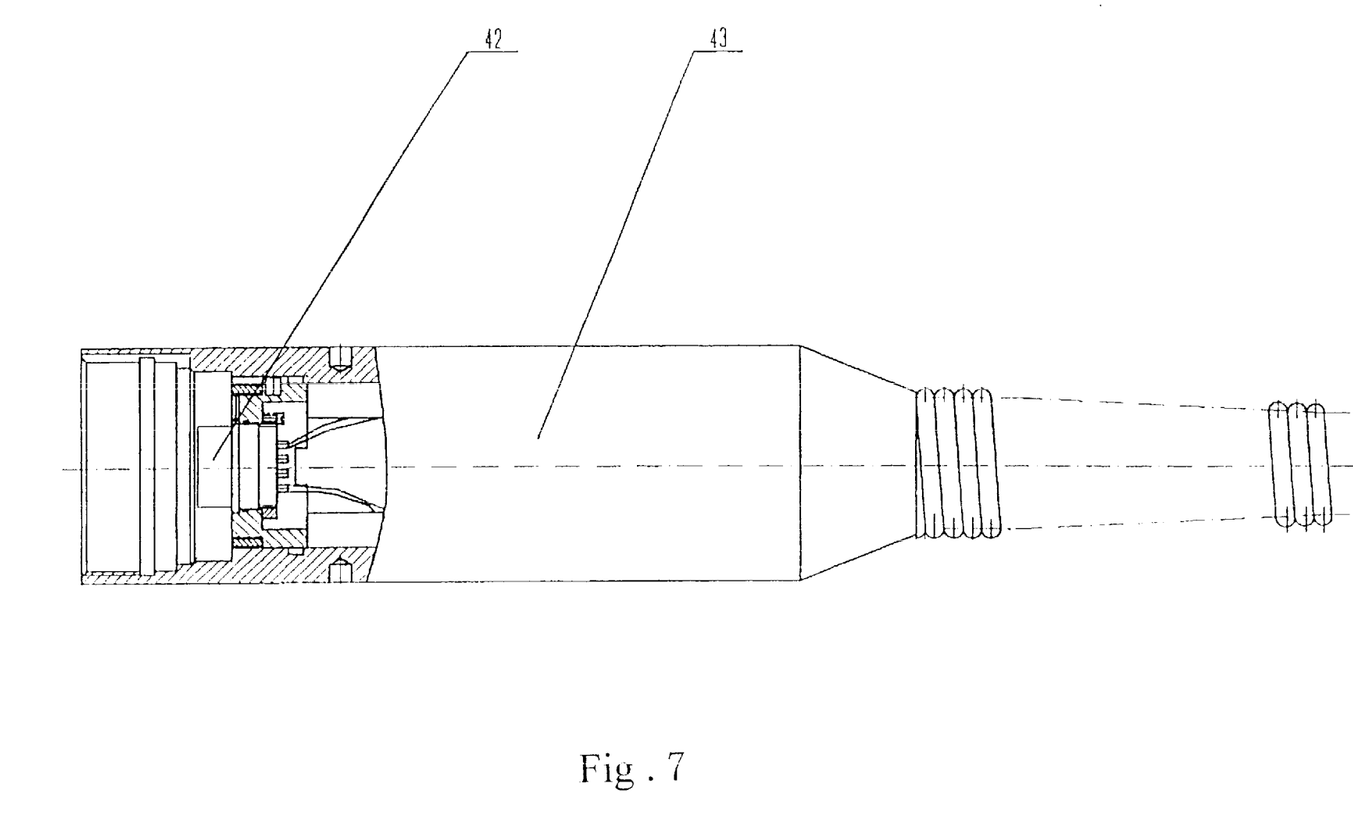
FIG. 7. is a schematic diagram of the structure of the cable joint according to the present invention.

According to FIG. 7, each cable joint 6, as shown in FIG. 1, comprises a multi-pin socket 42 and the cable joint body 43. The cable joint is designed to insure the water-sealed or water-resistant performance between the ocean bottom cable 1 and the housing 5 so that the integrated ocean bottom towed four-component array for seismic data acquisition will not be loose and will not leak during use in an ocean bottom towing operation.

One end of the cable joint body 43 is connected with the submarine cable 1, while another end is connected to the housing 5, again as seen in FIG. 1. A multi-pin socket 42 of submarine cable is connected with the cores of the power line 36 and the cores of the data transmission line 39 of the submarine cable 1.

Although the disclosed embodiments have been described in detail, it should be understood that various changes, substitutions and alterations can be made to the embodiments described without departing from their spirit and scope.

We claim:

1. An integrated ocean bottom towed four-component array for seismic data acquisition comprising a submarine cable (1) having a cable joint (6) and a hydrophone section (2), a four-channel electronic section for seismic data acquisition (3), and a three-component geophone section (4) assembled in a sealed housing (5), wherein the housing (5) is connected with the submarine cable (1) through the cable joint (6), characterized in that:

(a) the said submarine cable (1) comprises a core having an armored structure in which a power line (36) and a data transmission line (39) are assembled in its central part, packing cords (41) surrounding an internal protective layer (38) are filled up around armored structure, inner layer steel wire ropes (37) and outer layer steel wire ropes (40) are assembled as cable reinforcement elements covered by an external protective layer (35);

(b) the said hydrophone section (2) comprises a plurality of round ceramic wafers (11) on the acoustically transparent housing (13) and an impedance converting transformer (12) to form a real acceleration sensor;

(c) the said electronic section for seismic data acquisition (3) comprises a CPU board (14), a data transmission board (15), an acquisition board for channel 1–2 (16), an acquisition board for channel 3–4 (17) and a power board (18) on a printed circuit stand (19), having (V), (SX), (SY) and (H) signal input channels for data acquisition;

(d) the said geophone section (4) comprises two horizontal component geophones (7) and (8), and one vertical component geophone (9) to form three velocity sensors on a double-shall gimbal mount (10), with a short wire connected internally between the geophones and the acquisition channels; and, (e) further wherein each section is designed as a four-component receiving point and is connected to each other section via said submarine cable (1) in series to form a multi-channel acquisition system.

2. The integrated array according to claim 1, wherein said submarine cable (1) comprises two ends and a middle section, further characterized in that both ends of submarine cable (1) comprise cable joints (6) which are water-resistant, corrosion-resistant, and pressure-resistant, and further wherein one end of the cable joint body (43) of the submarine cable (1) is connected with the submarine cable (1), and another end is connected to the housing (5).

3. The integrated array according to claim 2, further characterized in that a multi-pin socket (42) of submarine cable is connected with cores of cable of the power line (36) of the submarine cable (1) and the data transmission line (39).

4. The integrated array according to claim 2, further characterized in that the middle section of the submarine cable (1) is free of taps and bindings, and the core of the cable with the armored structure comprises at least a pair of power lines (36) and two pairs of data transmission lines (39).

5. The integrated array according to claim 2, further characterized in that the said cable reinforcement element has two inner and outer layer corrosion-resistant steel wire ropes (37), (40) which are twisted and fabricated from multi-wire zinc high-carbon steel.

6. The integrated array according to claim 2, further characterized in that internal and external layers (38) and (35) are made of insulating materials as a cable protective layer.

7. The integrated array according to claim 2, further characterized in that the said cable joint (6) has a water-resistant structure in order to make the integrated array sealed from leakage when the array is used in an ocean bottom towing operation.

8. The integrated array according to claim 1, further characterized in that the hydrophone section (2) is an acceleration geophone having low frequency voltage output, with output voltage sensitivity over a range of about 10–1000 HZ being $13V\pm15\%$/bar, and the collected seismic data signals are transferred to input channel H of electronic section for seismic data acquisition (3).

9. The integrated array according to claim 1, further characterized in that the three-component geophone section (4) comprises three velocity geophones (7), (8) and (9) assembled on the same double-shall gimbal mount (10), which can realize a flexible 360° rotation, and the received vertical and shear wave component signals in seismic (P) waves are sent to input channels (V), (SX) and (SY) respectively of the electronic section for seismic data acquisition (3).

10. The integrated array according to claim 1, further characterized in that the said four-channel electronic section for seismic data acquisition (3) comprises channel acquisition boards 1–2 (16) and 3–4 (17) which consist of a line filter (20), a preamplifier (21), a $\Sigma$-$\Delta$ 24-bits A/D converter (22) including a modulator (23) and a digital filter (24) and a data register (25) to realize the reception and quantization of input data signals (V), (SX), and (SY) from said geophone section and (H) from said hydrophone section; and the quantized sampling data are edited according to sample rate and channel series and transferred to the data transmission section by a microprocessor control circuit.

11. The integrated array according to claim 1, further characterized in that the microprocessor control circuit comprises a microprocessor chip (26), a program and data storage element (27), and a read-write decoding and control circuit (28).

12. The integrated array according to claim 1, further characterized in that the said data transmission board (15)

consists of a data and command buffer (29), an encoding and decoding circuit, registers (30), and a receiving and transmitting interface circuit (31), wherein the interface circuit (31) receives the command data flow from the transmission line through input ports (A) and (C) to complete processes to set and control all parameters of the said four-channel electronic section for seismic data acquisition (3); the acquired data are transferred from the interface circuit through output ports (B) and (D) to the transmission line after encoding, then encoded data are transmitted through the transmission line of the cable to the ground central station for data recording; and the recorded tapes or disks are provided as source tapes or disks to the processing center for data processing so that the oil and gas structure information in a marine seismic survey can be obtained.

13. The integrated array according to claim 1, further characterized in that the power board (18) consists of DC/DC converters (32), (33) and a line power input device (34).

14. The intergrated array according to claim 1, further characterized in that a ground central station provides the said four-channel electronic section for seismic data acquisition (3) through the submarine cable (1) with power 60V–240V DC volate, and the line power input device simultaneously provides DC/DC converters (32) and (33) with +5V DC power for the digital circuit and ±5V DC power for the analog circuit.

* * * * *